(12) United States Patent
Paleczek

(10) Patent No.: US 12,227,049 B1
(45) Date of Patent: Feb. 18, 2025

(54) DECOUPLING CARRIER FOR AN ELECTRO-HYDRAULIC UNIT

(71) Applicant: Dr. Ing. h.c. F. Porsche Aktiengesellschaft, Stuttgart (DE)

(72) Inventor: Josef Paleczek, Tiefenbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/673,712

(22) Filed: May 24, 2024

(30) Foreign Application Priority Data

Aug. 18, 2023 (DE) .................. 10 2023 122 139.6

(51) Int. Cl.
*B60G 17/015* (2006.01)
*B60G 17/08* (2006.01)

(52) U.S. Cl.
CPC .......... *B60G 17/0152* (2013.01); *B60G 17/08* (2013.01); *B60G 2204/20* (2013.01)

(58) Field of Classification Search
CPC . B60G 17/0152; B60G 17/08; B60G 2204/20
See application file for complete search history.

(56) References Cited

U.S. PATENT DOCUMENTS

| 5,141,244 | A | * | 8/1992 | Clotault | ............ | B60G 17/08 |
| | | | | | | 280/124.102 |
| 5,697,678 | A | | 12/1997 | Huber | | |
| 7,543,824 | B2 | * | 6/2009 | Chapman | ............ | B60G 17/0408 |
| | | | | | | 280/5.514 |
| 8,991,840 | B2 | * | 3/2015 | Zuleger | ................ | F16F 9/5123 |
| | | | | | | 280/124.16 |
| 12,090,807 | B2 | * | 9/2024 | Mangelschots | ......... | F16F 9/466 |
| 2005/0053487 | A1 | | 3/2005 | Munker et al. | | |

FOREIGN PATENT DOCUMENTS

| DE | 4317467 A1 | 12/1994 |
| DE | 102004046828 A1 | 4/2005 |
| DE | 102010036668 A1 | 2/2012 |
| DE | 102018122226 A1 | 3/2020 |

OTHER PUBLICATIONS

German Examination Report for German Application No. 10 2023 122 139.6, mailed Jun. 24, 2024 with English translation. (6 pages).

* cited by examiner

*Primary Examiner* — Faye M Fleming
(74) *Attorney, Agent, or Firm* — Buchanan Ingersoll & Rooney PC

(57) ABSTRACT

A decoupling carrier for an electro-hydraulic unit for a chassis of a motor vehicle. The decoupling carrier includes (i) at least one damper receptacle, which can be connected to an electro-hydraulic unit in a force-transmitting manner; (ii) a damper body for each damper receptacle; and (iii) a fastening receptacle for the power-transmitting connection to a chassis carrier of a motor vehicle for each damper body. The fastening receptacle includes a receptacle opening for a line carrier.

9 Claims, 3 Drawing Sheets

DECOUPLING CARRIER FOR AN ELECTRO-HYDRAULIC UNIT

CROSS-REFERENCE TO RELATED APPLICATION

This application claims priority to German Patent Application No. 10 2023 122 139.6, filed Aug. 18, 2023, the content of such application being incorporated by reference herein in its entirety.

FIELD OF THE INVENTION

The invention relates to a decoupling carrier for an electro-hydraulic unit, as well as a motor vehicle with such a decoupling carrier.

BACKGROUND OF THE INVENTION

It has become established in many motor vehicles that the chassis is adjustable, for example height-adjustable and/or a damper characteristic can be changed. A hydraulic fluid is used for this purpose, the pressure and, if necessary, the volume of which can be actively changed in the damper system of the chassis. Particularly with regard to the increasing electrification of the drive of motor vehicles, but also with regard to the response times and dynamics of such applications, electric pumps are used, namely one per axle or even per wheel. The pumping operation generates vibrations, which can be perceived as disturbing by a passenger of a motor vehicle. It is therefore desired to connect such an electro-hydraulic unit to the chassis or the chassis carrier of the motor vehicle in a damped manner. The electro-hydraulic unit, but also other electrical operating units, must be connected to lines (for example power cables, signal cables, and/or hoses). On the one hand, these are to be laid in a well-protected manner and on the other hand require as little construction space as possible, which is increasingly constricted by the use of individual local (especially electrical) operating units.

SUMMARY OF THE INVENTION

The features of the claims may be combined in any technically meaningful manner, for which purpose it is also possible to consult the explanations from the following description and features from the figures, which comprise additional configurations of the invention.

A decoupling carrier for an electro-hydraulic unit for a chassis of a motor vehicle, comprises at least the following components:
  at least one damper receptacle, which can be connected to an electro-hydraulic unit in a force-transmitting manner;
  a damper body for each damper receptacle; and
  a fastening receptacle for the power-transmitting connection to a chassis carrier of a motor vehicle for each damper body.

The decoupling carrier is characterized in particular in that the fastening receptacle comprises a receptacle opening for a line carrier.

Unless explicitly stated otherwise, ordinal numbers are used in the preceding and the following description only for the purposes of clear distinction and do not reflect any order or ranking of the designated components. An ordinal number greater than one does not imply that another such component has to necessarily be present.

The decoupling carrier is configured to protect an electro-hydraulic unit or other operating unit from vibrations from the chassis side or conversely to protect the chassis carrier from the introduction of vibrations from the unit in question and thus prevent the development of noises or other disruptive consequences of such vibrations. The decoupling carrier is thus configured on the one hand for a sufficiently stiff connection of the respective unit and on the other hand has good damping characteristics. It is advantageous to use a rubber-like material, which is (at least approximately) incompressible and can dissipate induced stresses into motion and heat. For example, a so-called thermoplastic elastomer is advantageous due to its recyclability.

It should be noted that preferably two or more damper receptacles are formed, namely preferably per connection point on the chassis carrier, i.e., four damper receptacles at two (axially spaced) connection points on a chassis carrier.

The damper receptacle is adapted for mechanically connecting the decoupling carrier to the unit to be coupled. For example, the damper receptacle comprises one or more bores via which the decoupling carrier can be fixedly connected to the relevant unit. The damper receptacle is further adapted so that a damper body can be fastened thereto.

For example, the damper receptacle comprises a bore into which the damper body can be fastened in a form-fit and/or force-fit manner. Alternatively or additionally, the damper body can be thermally connected, for example welded or vulcanized. It should be noted that in one embodiment, the damper body is externally attached around a corresponding pin of the damper receptacle. In one embodiment, the damper body is a rotationally symmetrical component. In one embodiment, the damper body is an angular, preferably square, component.

The fastening receptacle is arranged in relation to the damper body beyond the connection to the chassis carrier, such that during use, a force transmission (at least in operation according to the design) is conducted exclusively via the damper material of the damper body. In one embodiment, the fastening receptacle is configured as a sleeve having a bore and/or bolt-like outer surface or as a bolt (with or without thread). In one embodiment, the damper body is surrounded on the outside by the fastening receptacle.

It is now proposed here that the fastening receptacle comprises a receptacle opening for a line carrier. The fastening receptacle is arranged on the chassis side, such that a line carrier is indirectly connected to the chassis carrier when connected via the receptacle opening and is decoupled (or not coupled at all) from the unit to be suspended. There is often sufficient space for lines, for example a cable and/or a hose, in the area where the decoupling carrier is connected to the chassis carrier, in particular, there is often an area for a supply cable for the unit in question. Furthermore, no additional construction space is required for fastening the line carrier. In one embodiment, the receptacle opening is a bore into which a screw or a bolt of the line carrier can be inserted.

It is further proposed in an advantageous embodiment of the decoupling carrier that the receptacle opening comprises at least one undercut, and the line carrier comprises a clip for a force-fit and form-fit connection via the at least one undercut to the receptacle opening, wherein preferably the undercut is formed by means of a threaded cut, and the clip comprises a complementary fir tree structure.

In this embodiment, a click connection is created in that the receptacle opening has an undercut, behind which a complementary clip with its barb can be inserted in a form-fitting manner. For many applications, the form-fit transferrable forces are sufficient for holding the at least one line by means of the line carrier.

In an advantageous embodiment, the undercut is formed by means of a threaded cut. It should be noted that the term threaded cut is only formed in one embodiment by means of threaded cutting and does not exclude that it is formed during casting of the component with the receptacle opening, by means of extrusion or by other common or yet to be developed means.

In one advantageous embodiment, the clip is formed with a so-called fir tree structure, which means that it has a plurality of arrow-shaped barbs along an axis (assembly direction). In one embodiment, some or all of these barbs are circumferential. Alternatively, individual barbs of this type are arranged spaced apart from one another in the circumferential direction, for example also offset from one another in the axial sequence of the barbs in the circumferential direction. A complementary formed fir tree structure is formed to match the thread pitch of the threaded cut of the receptacle opening.

It is further proposed in an advantageous embodiment of the decoupling carrier that the fastening receptacle is formed from a, preferably metallic, bearing bushing of the damper body.

Here, it is proposed that the damper body comprises a bearing bushing, which is connected to the damper material of the damper body by means of, for example, vulcanizing or thermal welding. In one embodiment, in addition to or as an alternative to a materially bonded connection, the bushing is connected to the damper material of the damper body in a force-fit and/or form-fit manner.

The bearing bushing has a central opening for a fastening means, for example a screw. This opening is often longer than needed for a fastening means. As a result, a receptacle opening, for example equipped with a threaded cut, can be connected in axial extension of the opening without affecting the construction space. This receptacle opening preferably has a diameter which is formed as a through-opening for a head of a fastening means (for example a rivet), i.e., is larger than the head diameter of the fastening means. For example, the bearing bushing has a collar on the end side (preferably formed circumferentially) in its opening, via which the bearing bushing (and thus the damper body) can be connected to the chassis carrier in a friction-fit manner. In the extension of the opening on the head side of the collar, the receptacle opening for a corresponding line carrier is formed over the entire length or a partial section, for example by means of a threaded cut.

It is further proposed in an advantageous embodiment of the decoupling carrier that the fastening receptacle can be fastened to a chassis carrier of a motor vehicle by means of a screw or by means of a bolt, preferably by means of a threaded bolt.

In this embodiment, the fastening receptacle of the damper body is releasably connected to the chassis carrier in the insert. A screw is used to form a connection that is easy to install and reliable over the intended service life. A large transverse force or shear force can be transmitted by means of a bolt, which is easy to install and requires less (axial) pressing forces than a screw. The axial locking can then be achieved using, for example, a head and a retaining ring. A screw bolt is formed in a mixed form, which is designed as a bolt in the area of the introduction of a transverse force and has a threaded section for axial securing.

It is further proposed in an advantageous embodiment of the decoupling carrier that the receptacle opening for the line carrier is designed as a through-hole for the screw or bolt, preferably for the head thereof.

In this embodiment (as already described above with reference to the embodiment with the bearing bushing), a through-hole is formed in which a head of a screw, a bolt (or a threaded bolt), or also a rivet can be passed through with play (i.e., undersize) up to a stop (for example formed from a collar on the end side).

It is further proposed in an advantageous embodiment of the decoupling carrier that the decoupling carrier is shaped like goggles and comprises two damper receptacles.

In this embodiment, two damper receptacles are provided, which are formed with through-openings, in each of which the corresponding damper body is received in the assembled state. Preferably, the connection to the relevant unit (to be decoupled) is arranged centrally between the two damper receptacles, and in the case of an electro-hydraulic unit, the hose connections for the hydraulic fluid to be conveyed are also preferably arranged.

It is further proposed in an advantageous embodiment of the decoupling carrier that the decoupling carrier has a contact surface, which is in direct contact in the insert with a corresponding counterface of an electro-hydraulic unit.

The contact surface is fixedly connected to the damper receptacle, preferably without damping means, and is particularly preferably integrally formed in one piece with it, for example as a cast component (formed in a single casting process) or as a component milled from the solid. Alternatively or additionally, the contact surface and the damper receptacle are formed from a component by welding individual components.

The contact surface allows large-area contact with the corresponding counterface of the unit in question and thus a low surface pressure or a large (preferably purely force-fit or friction-fit) force transmission with minimal means, for example a screw connection. In a goggle-like embodiment with two damper receptacles, preferably the contact surface is arranged between the two damper receptacles. In a larger number of damper receptacles, the contact surface is preferably arranged centrally between the damper receptacles. In one embodiment, passages formed for hoses, for example, are formed in the area of, i.e., spatially surrounded by, the contact surface.

Proposed according to a further aspect is a motor vehicle, which comprises at least the following components:
  at least one drive machine for propelling the motor vehicle;
  a chassis having a chassis carrier and at least one propulsion wheel suspended on a wheel suspension;
  an electro-hydraulic unit according to one embodiment according to the above description;
  a transport cabin supported by the chassis support; and
  a transmission line by means of which the at least one drive machine is connected to the at least one propulsion gear in a torque-transmitting manner,
wherein preferably the damper characteristic of the at least one wheel suspension can be modulated, particularly preferably dynamically by means of the electro-hydraulic unit.

The motor vehicle is, for example, a conventional motor vehicle for conveying goods, for example as a truck, and/or people, for example as a passenger car. It is preferably adapted for semi-autonomous or fully autonomous driving and preferably has a corresponding computing capacity (especially processor power) and sensors as well as at least one communication device, for example WLAN (Wireless Local Area Network) and/or mobile communications.

The transport cabin is adapted to receive at least one passenger (also referred to as a passenger cabin or passenger cell) and/or to transport goods. For example, in a fully autonomous motor vehicle for transporting goods, a passenger cabin is not provided. The motor vehicle comprises at least one drive machine for propulsion, for example a rear drive (for example as a main drive) and a front drive (for example as a boost drive). In one embodiment, at least one of the drive machines is an internal combustion engine. In one embodiment, at least one, preferably all, drive machines are electric motors. Accordingly, a traction battery is then provided to supply the at least one electric motor with a sufficiently high electrical voltage.

The transmission line is configured (usually in a complex manner) to perform the torque and, if necessary, the release of a torque transmission and other torque-related tasks. For example, the transmission line comprises a (possibly shiftable) transmission gear, a differential for each drive axle, a separating clutch, and a torsion vibration damper. In one embodiment, a separate transmission line is formed for each drive machine. In one embodiment, the plurality of drive machines are incorporated into a common transmission line.

For example, the electro-hydraulic unit is configured to provide hydraulic pressure and/or a volume change for a damper. Preferably, the electro-hydraulic unit is configured for high-speed requirements (such as adjustment of damper characteristics when cornering) by means of an external or integrated computing device.

The chassis is adapted for tracking and transmitting the torque of the at least one drive machine or as a mechanical abutment for the drive machine and the transmission line as well as the wheel suspension. In one embodiment, the chassis carrier is part of the so-called chassis of the motor vehicle. The wheel suspension comprises a spring-damper device, for example one per wheel.

The wheel suspension comprises a (for example hydraulic) damper. For example, the damper can be (dynamically) modulated by means of the electro-hydraulic unit for a driving mode of the motor vehicle or for current cornering stabilization. Alternatively or additionally, a (quasi-)static chassis height, i.e., underbody clearance, can be adjusted by means of the electro-hydraulic unit in conjunction with the wheel suspension.

BRIEF DESCRIPTION OF THE DRAWINGS

The above-described invention is discussed in detail in the following in the context of the relevant technical background with reference to the accompanying drawings which show preferred embodiments. The invention is not limited in any way by the purely schematic drawings, whereby it should be noted that the drawings are not true to scale and are not suitable for defining dimensional relationships. The figures show.

DETAILED DESCRIPTION OF THE INVENTION

Figure 1:
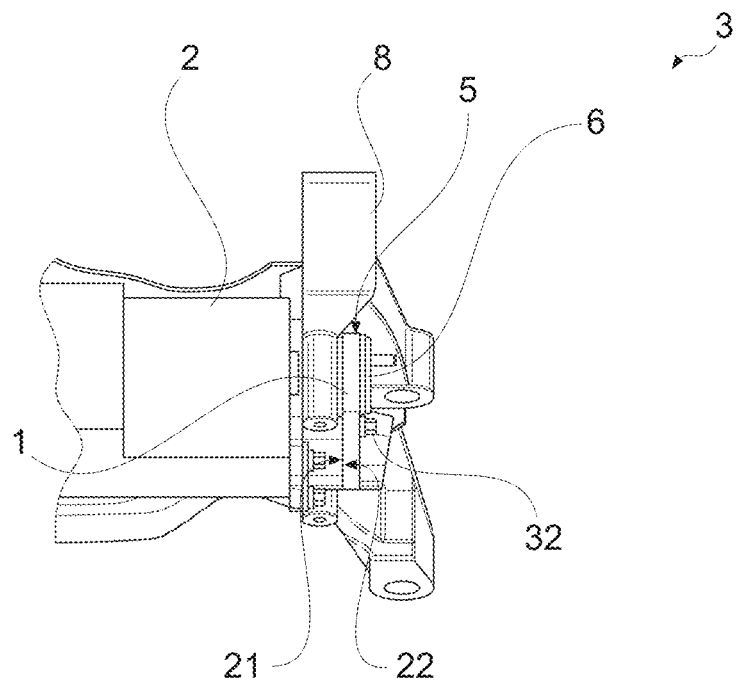
FIG. 1: a section of a chassis with an electro-hydraulic unit mounted on a chassis carrier by means of a decoupling carrier.

FIG. 1 shows a section of a chassis 3 with an electro-hydraulic unit 2 mounted on a chassis carrier 8 by means of a decoupling carrier 1. A section of the electro-hydraulic unit 2 is shown on the left side of the illustration. The decoupling carrier 1 can be seen on the right in the illustration. The chassis carrier 8 is shown between the electro-hydraulic unit 2 and the decoupling carrier 1. The decoupling carrier 1 is connected by means of a contact surface 21 to the complementary counterface 22 of the electro-hydraulic unit 2 in a friction-fit manner (here by means of a screw connection 32). The decoupling carrier 1 is connected to the chassis carrier 8 via the damper body 6 (e.g., formed from a thermoplastic elastomer) received in the damper receptacle 5, fastened here by means of screws 16 (compare with FIG. 2).

Figure 2:
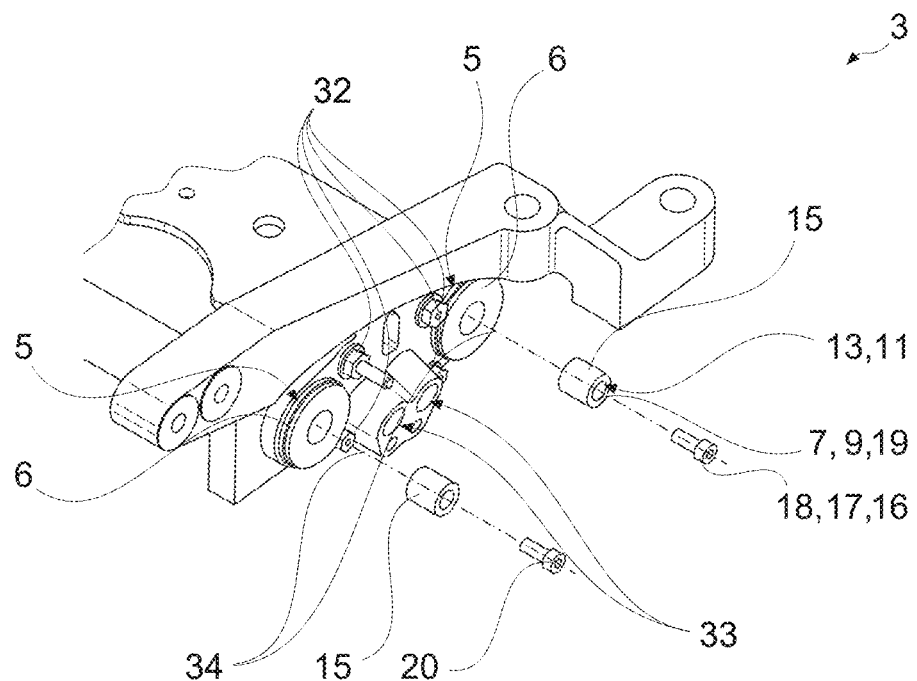
FIG. 2: an exploded view of the section of a chassis according to FIG. 1.

FIG. 2 shows an exploded view of the section of a chassis 3 according to FIG. 1, wherein the electro-hydraulic unit 2, the chassis carrier 8 and the decoupling support 1 are shown in the correct relative position. Reference is made to the description above and only the components visible here are explained in more detail. Not all details are provided with reference numerals for clarity. The decoupling carrier 1 is constructed here in a goggle-like manner with two damper receptacles 5 and damper bodies 6 with hydraulic connections 33 and the screw connection 32 centrally between the two damper receptacles 5. In the embodiment shown, a bearing bushing 15 is arranged in the respective damper body 6 (shown here pulled out to the front right along the assembly axis 34 in the exploded view). The bearing bushing 15 forms a fastening receptacle 7, which is designed as a through-hole 19 (with a concealed end collar as a stop for the head 20) for a screw 16, a threaded bolt 18 or a bolt 17 (shown here pulled out to the front right along the mounting axis 34 in the exploded view), by means of which the electro-hydraulic unit 2 is fastened to the chassis support 8 decoupled from vibrations via the damper material of the damper body 6. The through-hole 19 is designed with a structure for forming an undercut 11, for example having a threaded cut 13, such that a line carrier 10 can be connected to this through-hole 19 by means of a clip 12 (for example as shown in FIG. 4) in a form-fit and/or friction-fit manner.

Figure 3:
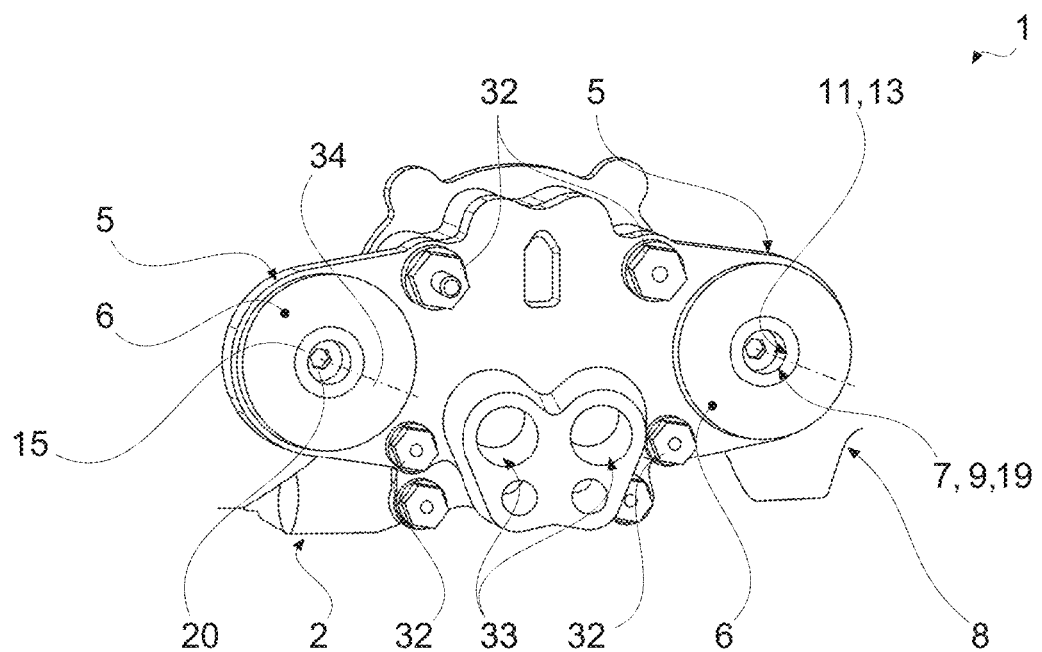
FIG. 3: a top view of a decoupling carrier as in the section of a chassis according to FIG. 1.

FIG. 3 shows a top view of a decoupling carrier 1 as in the section of a chassis 3 according to FIG. 1 and FIG. 2. Here too, reference is made to the description above and only the components visible here are explained in more detail. Not all details are provided with reference numerals for clarity. It can be seen that the head 20 of the screw 16 (or the threaded bolt 18 or the bolt 17, compare with FIG. 2) is recessed in the through-hole 19 of the bearing bush 15 (in contact with the corresponding collar, concealed here) and that a through-hole 19 forming the fastening receptacle 7 for the decoupling carrier 1 is connected to a receptacle opening 9 along the mounting axis 34. This is (as already described) equipped with a threaded cut 13 as an undercut 11 for a clip 12 of a line carrier 10, for example.

Figure 4:
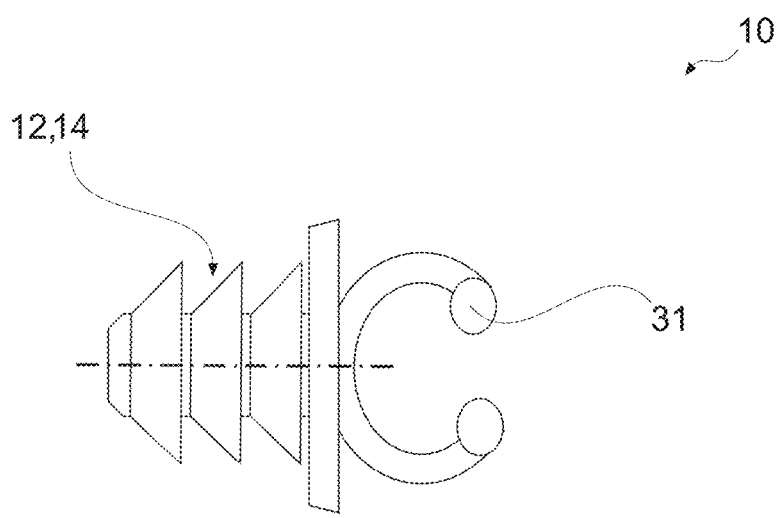
FIG. 4: a schematic side view onto a line carrier.

FIG. 4 shows a schematic side view onto a line carrier 10. On the right side in the illustration, this has a (here C-shaped) line gripper 31, which is adapted to receive a line 30, and preferably also in a form-fit and/or force-fit manner. This is easily seen in FIG. 5. On the left-hand side in the illustration is the clip 12, here designed with a fir tree structure 14, for example for engagement in a threaded section 13 in a form-fit and force-fit manner.

Figure 5:
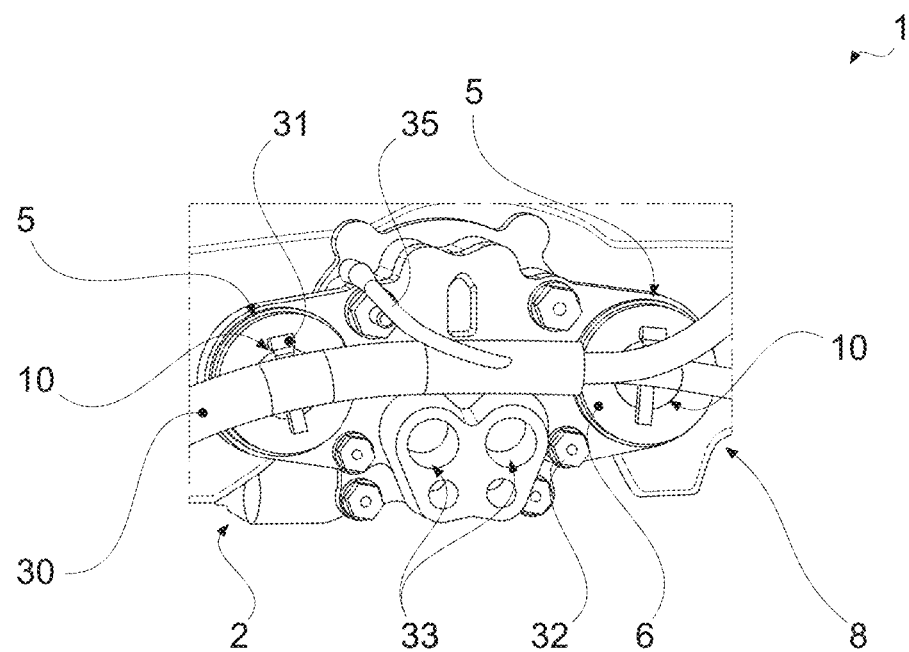
FIG. 5: the top view according to FIG. 3 with a line carrier and a line.

FIG. 5 shows the top view according to FIG. 3 with a line carrier 10 and a line 30. Here too, reference is made to the description above and only the components visible here are explained in more detail. Not all details are provided with reference numerals for clarity. The line carrier 10 is inserted into the receptacle opening 9 of the bearing bushing 15 (concealed here, compare with FIG. 3). A line 30 is received from the (here C-shaped) line gripper 31 of the line carrier 10. Here the line 30 is a cable for power current and/or for the signal line, for example. Here the line 30 comprises (purely optionally) a plurality of strands which branch and from which a branch 35 is connected to the electro-hydraulic unit 2. It can be seen here that a free construction space is optimally utilized by the line 30, for example not colliding with hoses for the hydraulic connections 33 (not connected here) and even the screw connection 32 of the decoupling carrier 1 remains freely accessible.

Figure 6:
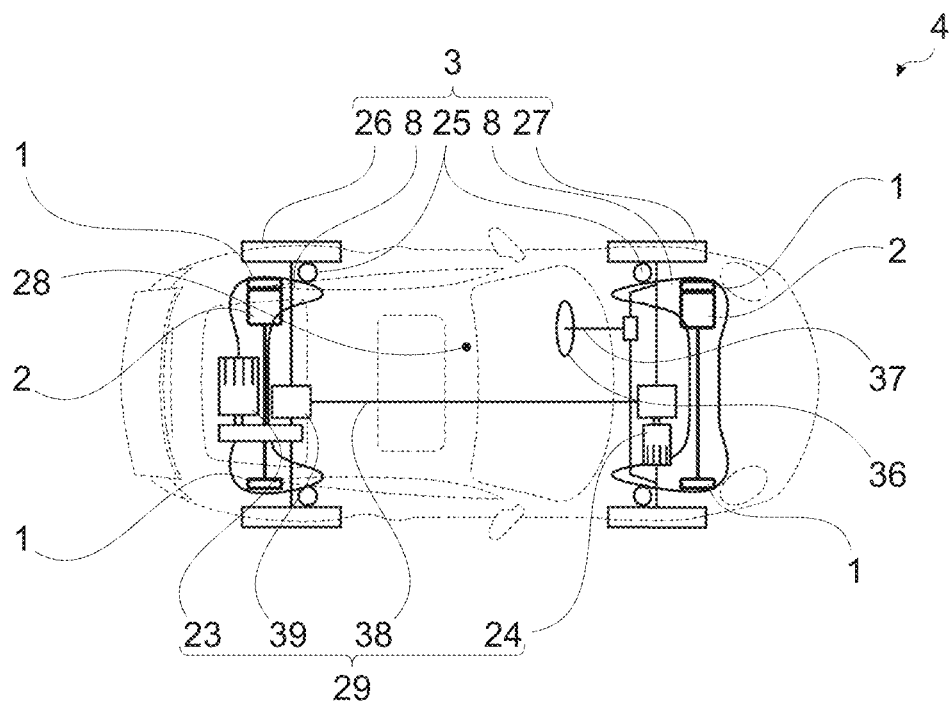
FIG. 6: a motor vehicle having a chassis in a schematic top view.

FIG. 6 shows a schematic top view of a motor vehicle 4 with a chassis 3, in which a chassis support 8 can be seen in the front (shown on the right) and in the rear (shown on the left). The motor vehicle 4 has (purely optionally) a rear drive machine 23 and a front drive machine 24, which are connected to a common transmission string 29 via a cardan shaft 38 for transmitting a torque to the drive wheels 26,27. A (e.g., shiftable) transmission gear 39 is still visible here from the transmission line 29. The motor vehicle 4 can be controlled from the transport cabin 28 (here, for example, to receive passengers) by means of a steering wheel 36 via a steering shaft 37. The chassis 3, on which a transport cabin 28 is carried, comprises two wheel suspensions 25 for the respective wheel (here all of the propulsion wheels 26,27) on each of the chassis carriers 8. An electro-hydraulic unit 2 is arranged between the respective pair of propulsion wheels 26,27. It can be seen that sufficiently protected construction space for lines 30 is very limited.

The decoupling carrier proposed here enables an inexpensive and space-optimized line routing.

What is claimed is:

1. A decoupling carrier for an electro-hydraulic unit of a motor vehicle chassis, said decoupling carrier comprising:
   at least one damper receptacle that is configured to be connected to the electro-hydraulic unit in a force-transmitting manner;
   a damper body for the at least one damper receptacle; and
   a fastening receptacle for a power-transmitting connection to a chassis carrier of a motor vehicle for the damper body,
   wherein the fastening receptacle comprises a receptacle opening for a line carrier.

2. The decoupling carrier according to claim 1, wherein:
   the receptacle opening comprises at least one undercut, and
   the line carrier comprises a clip for a friction-fit and form-fit connection to the receptacle opening by way of the at least one undercut,
   wherein the undercut is formed by a threaded cut and the clip has a complementary fir tree structure.

3. The decoupling carrier according to claim 1, wherein the fastening receptacle is formed from a bearing bushing of the damper body.

4. The decoupling carrier according to claim 1, wherein the fastening receptacle is configured to be fastened to a chassis support of a motor vehicle by a screw or by a threaded bolt.

5. The decoupling carrier according to claim 4, wherein the receptacle opening for the line carrier is a through-hole for a head of the screw or the bolt.

6. The decoupling carrier according to claim 1, wherein the decoupling carrier has a goggle-like shape and comprises two damper receptacles.

7. The decoupling carrier according to claim 1, wherein the decoupling carrier comprises a contact surface that is in direct contact with a corresponding counterface of the electro-hydraulic unit.

8. An electro-hydraulic unit of a motor vehicle chassis comprising the decoupling carrier according to claim 1.

9. A motor vehicle comprising:
   at least one drive machine for propelling the motor vehicle;
   a chassis having a chassis support and at least one propulsion wheel suspended on a wheel suspension;
   the electro-hydraulic unit according to claim 8;
   a transport cabin carried by the chassis carrier; and
   a transmission line by way of which the at least one drive machine is connected to the at least one propulsion wheel in a torque-transmitting manner,
   wherein the electro-hydraulic unit is configured to dynamically modulate damper characteristics of the wheel suspension.

* * * * *